US012387711B2

(12) United States Patent
Kim et al.

(10) Patent No.: US 12,387,711 B2
(45) Date of Patent: Aug. 12, 2025

(54) SPEECH SYNTHESIS DEVICE AND SPEECH SYNTHESIS METHOD

(71) Applicant: LG ELECTRONICS INC., Seoul (KR)

(72) Inventors: Sangki Kim, Seoul (KR); Sungmin Han, Seoul (KR); Siyoung Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 222 days.

(21) Appl. No.: 17/959,050

(22) Filed: Oct. 3, 2022

(65) Prior Publication Data

US 2023/0148275 A1 May 11, 2023

(30) Foreign Application Priority Data

Nov. 9, 2021 (KR) ........................ 10-2021-0153450
Aug. 31, 2022 (KR) ........................ 10-2022-0109688

(51) Int. Cl.
*G10L 25/30* (2013.01)
*G10L 13/047* (2013.01)

(52) U.S. Cl.
CPC ............ *G10L 13/047* (2013.01); *G10L 25/30* (2013.01)

(58) Field of Classification Search
CPC .............................. G10L 13/047; G10L 25/30
USPC .......................................................... 704/258
See application file for complete search history.

(56) References Cited

U.S. PATENT DOCUMENTS 10,186,252 B1 1/2019 Mohammadi
10,255,905 B2 * 4/2019 Chua .................. G10L 15/1815
2005/0203743 A1 * 9/2005 Hain ...................... G06F 3/167 704/258
2008/0288257 A1 * 11/2008 Eide ...................... G10L 13/10 704/E13.011
2014/0278379 A1 9/2014 Coccaro et al.
(Continued)

FOREIGN PATENT DOCUMENTS

CN 111226275 6/2020
CN 119091928 A * 12/2024
KR 1020190085882 7/2019

OTHER PUBLICATIONS

J. Hu and A. Hamdulla, "Research on the Methods of Speech Synthesis Technology," 2021 IEEE 2nd International Conference on Pattern Recognition and Machine Learning (PRML), Chengdu, China, 2021, pp. 227-233, doi: 10.1109/PRML52754.2021.9520718. keywords: {Deep learning;Vocoders;Web and internet servic (Year: 2021).*

(Continued)

*Primary Examiner* — Bharatkumar S Shah

(74) *Attorney, Agent, or Firm* — LEE, HONG, DEGERMAN, KANG & WAIMEY

(57) ABSTRACT

Provided is a speech synthetic device capable of outputting a synthetic voice having various speech styles. The speech synthesis device includes a speaker, and a processor to acquire voice feature information through a text and a user input; generate a synthetic voice, by receiving the text and the voice feature information inputs into a decoder supervised-trained to minimize a difference between feature information of a learning text and characteristic information of a learning voice, and output the generated synthetic voice through the speaker.

12 Claims, 7 Drawing Sheets

(56) References Cited

U.S. PATENT DOCUMENTS

| | | | | |
|---|---|---|---|---|
| 2020/0058290 | A1 | 2/2020 | Chae et al. | |
| 2020/0082807 | A1* | 3/2020 | Kim | G10L 13/047 |
| 2021/0304769 | A1 | 9/2021 | Ye et al. | |
| 2022/0246132 | A1* | 8/2022 | Zhang | G10L 15/063 |
| 2023/0148275 | A1* | 5/2023 | Kim | G10L 13/047 704/258 |

OTHER PUBLICATIONS

A speech synthesis device comprising: a speaker; and a processor configured to: acquire voice feature information based on a text input and a user input to the speech synthesis device; generate a synthetic voice, by receiving the text and the voice feature information as inputs into a decoder supervi (Year: 2021).*

J. Hu and A. Hamdulla, "Research on the Methods of Speech Synthesis Technology," 2021 IEEE 2nd International Conference on Pattern Recognition and Machine Learning (PRML), Chengdu, China, 2021, pp. 227-233, doi: 10.1109/PRML52754.2021.9520718. keywords: {Deep learning: Vocoders;Web and internet servi (Year: 2021)*

Korean Intellectual Property Office Application No. 10-2022-0109688, Office Action dated Aug. 29, 2023, 5 pages.

Minchan Kim et al., "Expressive Text-to-Speech using Style Tag," arXiv:2104.00436v1 [eess.AS], Apr. 2021, 5 pages.

Korean Intellectual Property Office Application No. 10-2022-0109688, Office Action dated Jun. 12, 2024, 3 pages.

Raitio et al., "Controllable neural text-to-speech using intuitive prosodic features," arXiv:2009.06775v1 [eess.AS], Sep. 2020, 3 pages.

PCT International Application No. PCT/KR2022/013939, International Search Report and Written Opinion dated Jan. 3, 2023, 10 pages.

* cited by examiner

SPEECH SYNTHESIS DEVICE AND SPEECH SYNTHESIS METHOD

CROSS-REFERENCE TO RELATED APPLICATIONS

Pursuant to 35 U.S.C. § 119(a), this application claims the benefit of earlier filing date and right of priority to Korean Patent Application Nos. 10-2021-0153450, filed on Nov. 9, 2021 and 10-2022-0109688, filed on Aug. 31, 2022, the contents of which are all hereby incorporated by reference herein their entirety.

BACKGROUND

The present disclosure relates to a speech synthesis device.

A speech synthesis technology is a technology that converts a text into a voice, and outputs the voice.

Speech synthesis methods include Artificial synthesis, Formant synthesis, Conventional synthesis, and Statistical parametric speech synthesis.

In addition, recently, a deep learning-based speech synthesis technology has been spotlighted.

Among them, the most commonly used technologies are Concatenative synthesis and Statistical parametric speech synthesis.

Concatenative synthesis is called Unit Selection Synthesis (USS). The Concatenative synthesis provides a structure in which voice data recorded in unit of a word or a sentence unit is split into phonemes based on a certain criteria such that a unit DB is formed, and, to the contrary, phonemes suitable for the whole speech are retrieved from the unit DB and are connected when a voice is synthesized.

An important technique in Concatenative synthesis is the technique of selecting the optimal phoneme to most suitably express a voice, which is desired by a user, from among numerous phonemes stored in the unit DB, and a technique of smoothly connecting the phonemes.

In particular, the process of selecting the optimal phoneme is significantly complex actually, instead of being simple and includes consecutive difficult operations. In this case, the process includes a process of processing a language to extract information on a morpheme from a sentence, of predicting the rhyme based on the result obtained by processing the language, of predicting spacing (a boundary), and of selecting the optimal unit based on the result from the processing of the language, and the predicting of the rhyme, and the spacing (the boundary).

Next, Statistical parametric speech synthesis is based on a voice signal processing technology. Voice has a specific characteristic through an articulator. The specific characteristic is extracted from voice data by utilizing the signal processing technology and modeled. In this case, voice features extracted from data are referred to as parameters.

Statistical parametric speech synthesis includes a process of extracting and statistically modeling feature parameters, and a process of generating a relevant parameter from the statistical model when a text is input, and reforming the text to a proper voice through voice signal processing.

Concatenative synthesis has been most widely used technology in a current industry field, because of showing the best sound quality, of technologies of connecting units based on a recorded original sound. However, Concatenative synthesis has a limitation in that the rhythm becomes unstable in the process of connecting the notes.

Meanwhile, Statistical parametric speech synthesis shows stable rhymes and thus has been utilized in reading a book in an e-book filed. However, Statistical parametric speech synthesis causes noise (buzzing) in a vocoding process of forming a voice.

However, a deep learning-based speech synthesis technology has the advantages of the above two technologies, and overcomes the disadvantages of the two technologies. In addition, the deep learning-based speech synthesis technology shows significantly natural rhymes and superior sound quality.

In addition, the deep learning-based speech synthesis technology is based on learning. Accordingly, the speech styles of various persons are directly trained to express an emotion or a style. In addition, the deep learning-based speech synthesis technology is important because of producing a voice synthesizer having the voice of a person only using data recorded for only a few minutes to several hours.

However, a conventional deep learning-based speech synthesis model is generated through learning for 300 hours by using learning voice data generated for 20 hours by experts in the field of speech intelligence.

In addition, regarding a voice color conversion model, voice uttered by a user and recorded for three minutes to five minutes is used and learning is performed for about five hours, thereby generating an intrinsic voice color conversion model.

However, the above two models fail to output a synthetic voice having a speech style desired by a user, because the above models follow only the style of voice data used in learning.

SUMMARY

The present disclosure is to solve the above-described problems and other problems.

The present disclosure is to provide a speech synthesis device capable of generating a synthetic voice having a speech style desired by a user.

The present disclosure is to provide a speech synthesis device capable of producing a synthetic voice having various speech styles by allowing a user to personally control a voice feature.

According to an embodiment of the present disclosure, a speech synthesis device may include a speaker, and a processor to acquire voice feature information through a text and a user input; generate a synthetic voice, by receiving the text and the voice feature information inputs into a decoder supervised-trained to minimize a difference between feature information of a learning text and characteristic information of a learning voice, and output the generated synthetic voice through the speaker.

As described above, according to the embodiment of the present disclosure, even when the same learning data (voice data uttered by the same speaker) is used, the synthetic voice may be output in various speech styles.

Accordingly, the user may obtain the synthetic voice by adjusting the utterance style based on the situation.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Figure 1:
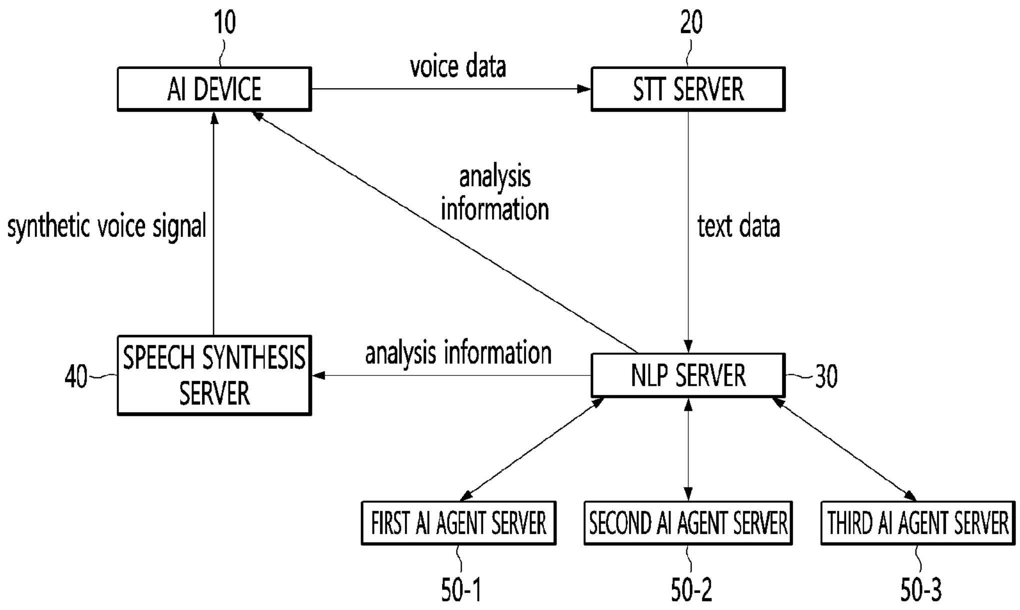
FIG. 1 is a view illustrating a speech system according to an embodiment of the present disclosure.

Hereinafter, embodiments are described in more detail with reference to accompanying drawings and regardless of the drawings symbols, same or similar components are assigned with the same reference numerals and thus repetitive for those are omitted. Since the suffixes “module” and “unit” for components used in the following description are given and interchanged for easiness in making the present disclosure, they do not have distinct meanings or functions. In the following description, detailed descriptions of well-known functions or constructions will be omitted because they would obscure the inventive concept in unnecessary detail. Also, the accompanying drawings are used to help easily understanding embodiments disclosed herein but the technical idea of the inventive concept is not limited thereto. It should be understood that all of variations, equivalents or substitutes contained in the concept and technical scope of the present disclosure are also included.

Although the terms including an ordinal number, such as “first” and “second”, are used to describe various components, the components are not limited to the terms. The terms are used to distinguish between one component and another component.

It will be understood that when a component is referred to as being coupled with/to” or “connected to” another component, the component may be directly coupled with/to or connected to the another component or an intervening component may be present therebetween. Meanwhile, it will be understood that when a component is referred to as being directly coupled with/to” or “connected to” another component, an intervening component may be absent therebetween.

An artificial intelligence device illustrated according to the present disclosure may include a cellular phone, a smart phone, a laptop computer, a digital broadcasting AI device, a personal digital assistants (PDA), a portable multimedia player (PMP), a navigation system, a slate personal computer (PC), a table PC, an ultrabook, a wearable device (for example, a watch-type AI device (smartwatch), a glass-type AI device (a smart glass), or a head mounted display (HMD)).

However, an artificial intelligence (AI) device 10 according to an embodiment of the present disclosure may be applied to a stationary-type AI device such as a smart TV, a desktop computer, a digital signage, a refrigerator, washing machine, an air conditioner, or a dish washer.

In addition, the AI device 10 according to an embodiment of the present disclosure may be applied even to a stationary robot or a movable robot.

In addition, the AI device according to an embodiment of the present disclosure may perform the function of a speech agent. The speech agent may be a program for recognizing the voice of a user and for outputting a response suitable for the recognized voice of the user, in the form of a voice.

FIG. 1 is a view illustrating a speech system according to an embodiment of the present disclosure.

A typical process of recognizing and synthesizing a voice may include converting speaker voice data into text data, analyzing a speaker intention based on the converted text data, converting the text data corresponding to the analyzed intention into synthetic voice data, and outputting the converted synthetic voice data. As illustrated in FIG. 1, a speech recognition system 1 may be used for the process of recognizing and synthesizing a voice.

Referring to FIG. 1, the speech recognition system 1 may include the AI device 10, a Speech To Text (STT) server 20, a Natural Language Processing (NLP) server 30, a speech synthesis server 40, and a plurality of AI agent servers 50-1 to 50-3.

The AI device 10 may transmit, to the STT server 20, a voice signal corresponding to the voice of a speaker received through a micro-phone 122.

The STT server 20 may convert voice data received from the AI device 10 into text data.

The STT server 20 may increase the accuracy of voice-text conversion by using a language model.

A language model may refer to a model for calculating the probability of a sentence or the probability of a next word coming out when previous words are given.

For example, the language model may include probabilistic language models, such as a Unigram model, a Bigram model, or an N-gram model.

The Unigram model is a model formed on the assumption that all words are completely independently utilized, and obtained by calculating the probability of a row of words by the probability of each word.

The Bigram model is a model formed on the assumption that a word is utilized dependently on one previous word.

The N-gram model is a model formed on the assumption that a word is utilized dependently on $(n-1)$ number of previous words.

In other words, the STT server 20 may determine whether the text data is appropriately converted from the voice data, based on the language model. Accordingly, the accuracy of the conversion to the text data may be enhanced.

The NLP server 30 may receive the text data from the STT server 20. The STT server 20 may be included in the NLP server 30.

The NLP server 30 may analyze text data intention, based on the received text data.

The NLP server 30 may transmit intention analysis information indicating a result obtained by analyzing the text data intention, to the AI device 10.

For another example, the NLP server 30 may transmit the intention analysis information to the speech synthesis server 40. The speech synthesis server 40 may generate a synthetic voice based on the intention analysis information, and may transmit the generated synthetic voice to the AI device 10.

The NLP server 30 may generate the intention analysis information by sequentially performing the steps of analyzing a morpheme, of parsing, of analyzing a speech-act, and of processing a conversation, with respect to the text data.

The step of analyzing the morpheme is to classify text data corresponding to a voice uttered by a user into morpheme units, which are the smallest units of meaning, and to determine the word class of the classified morpheme.

The step of the parsing is to divide the text data into noun phrases, verb phrases, and adjective phrases by using the result from the step of analyzing the morpheme and to determine the relationship between the divided phrases.

The subjects, the objects, and the modifiers of the voice uttered by the user may be determined through the step of the parsing.

The step of analyzing the speech-act is to analyze the intention of the voice uttered by the user using the result from the step of the parsing. Specifically, the step of analyzing the speech-act is to determine the intention of a sentence, for example, whether the user is asking a question, requesting, or expressing a simple emotion.

The step of processing the conversation is to determine whether to make an answer to the speech of the user, make a response to the speech of the user, and ask a question for additional information, by using the result from the step of analyzing the speech-act.

After the step of processing the conversation, the NLP server 30 may generate intention analysis information including at least one of an answer to an intention uttered by the user, a response to the intention uttered by the user, or an additional information inquiry for an intention uttered by the user.

The NLP server 30 may transmit a retrieving request to a retrieving server (not illustrated) and may receive retrieving information corresponding to the retrieving request, to retrieve information corresponding to the intention uttered by the user.

When the intention uttered by the user is present in retrieving content, the retrieving information may include information on the content to be retrieved.

The NLP server 30 may transmit retrieving information to the AI device 10, and the AI device 10 may output the retrieving information.

Meanwhile, the NLP server 30 may receive text data from the AI device 10. For example, when the AI device 10 supports a voice text conversion function, the AI device 10 may convert the voice data into text data, and transmit the converted text data to the NLP server 30.

The speech synthesis server 40 may generate a synthetic voice by combining voice data which is previously stored.

The speech synthesis server 40 may record a voice of one person selected as a model and divide the recorded voice in the unit of a syllable or a word.

The speech synthesis server 40 may store the voice divided in the unit of a syllable or a word into an internal database or an external database.

The speech synthesis server 40 may retrieve, from the database, a syllable or a word corresponding to the given text data, may synthesize the combination of the retrieved syllables or words, and may generate a synthetic voice.

The speech synthesis server 40 may store a plurality of voice language groups corresponding to each of a plurality of languages.

For example, the speech synthesis server 40 may include a first voice language group recorded in Korean and a second voice language group recorded in English.

The speech synthesis server 40 may translate text data in the first language into a text in the second language and generate a synthetic voice corresponding to the translated text in the second language, by using a second voice language group.

The speech synthesis server 40 may transmit the generated synthetic voice to the AI device 10.

The speech synthesis server 40 may receive analysis information from the NLP server 30. The analysis information may include information obtained by analyzing the intention of the voice uttered by the user.

The speech synthesis server 40 may generate a synthetic voice in which a user intention is reflected, based on the analysis information.

According to an embodiment, the STT server 20, the NLP server 30, and the speech synthesis server 40 may be implemented in the form of one server.

The functions of each of the STT server 20, the NLP server 30, and the speech synthesis server 40 described above may be performed in the AI device 10. To this end, the AI device 10 may include at least one processor.

Each of a plurality of AI agent servers 50-1 to 50-3 may transmit the retrieving information to the NLP server 30 or the AI device 10 in response to a request by the NLP server 30.

When intention analysis result of the NLP server 30 corresponds to a request (content retrieving request) for retrieving content, the NLP server 30 may transmit the content retrieving request to at least one of a plurality of AI agent servers 50-1 to 50-3, and may receive a result (the retrieving result of content) obtained by retrieving content, from the corresponding server.

The NLP server 30 may transmit the received retrieving result to the AI device 10.

Figure 2:
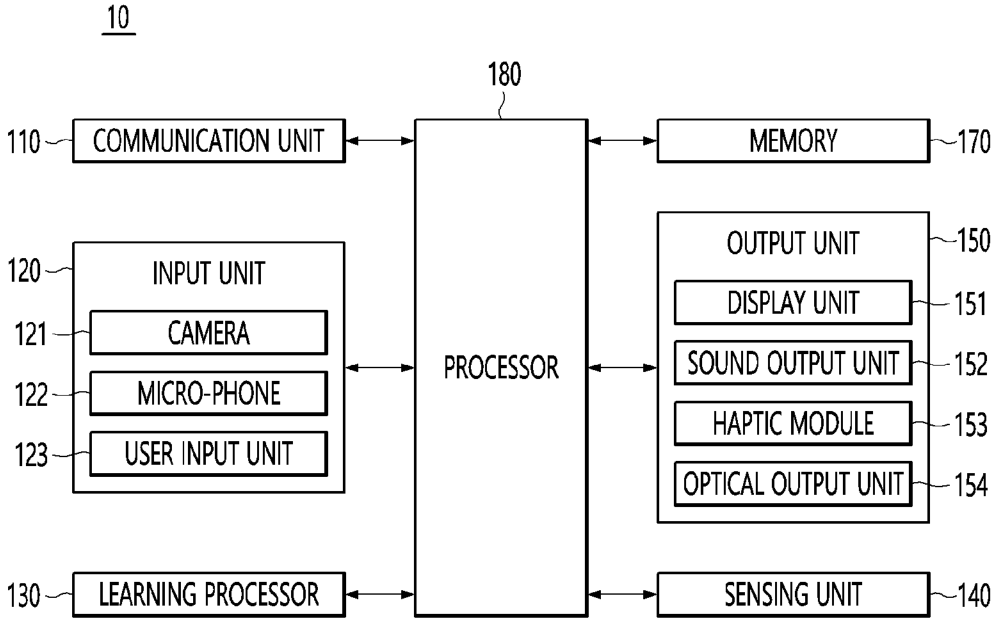
FIG. 2 is a block diagram illustrating a configuration of an AI device according to an embodiment of the present disclosure.

FIG. 2 is a block diagram illustrating a configuration of an AI device according to an embodiment of the present disclosure.

Referring to FIG. 2, the AI device 10 may include a communication unit 110, an input unit 120, a learning processor 130, a sensing unit 140, an output unit 150, a memory 170, and a processor 180.

The communication unit 110 may transmit and receive data to and from external devices through wired and wireless communication technologies. For example, the communication unit 110 may transmit and receive sensor information, a user input, a learning model, and a control signal to and from external devices.

In this case, communication technologies used by the communication unit 110 include Global System for Mobile Communication (GSM), Code Division Multi Access (CDMA), Long Term Evolution (LTE), 5G, Wireless LAN (WLAN), Wireless-Fidelity (Wi-Fi), Bluetooth (Bluetooth™), RFID (NFC), Infrared Data Association (IrDA), ZigBee, and Near Field Communication (NFC).

The input unit 120 may acquire various types of data.

The input unit 120 may include a camera to input a video signal, a microphone to receive an audio signal, or a user input unit to receive information from a user. In this case, when the camera or the microphone is treated as a sensor, the signal obtained from the camera or the microphone may be referred to as sensing data or sensor information.

The input unit 120 may acquire input data to be used when acquiring an output by using learning data and a learning model for training a model. The input unit 120 may acquire unprocessed input data. In this case, the processor 180 or the learning processor 130 may extract an input feature for pre-processing for the input data.

The input unit 120 may include a camera 121 to input a video signal, a micro-phone 122 to receive an audio signal, and a user input unit 123 to receive information from a user.

Voice data or image data collected by the input unit 120 may be analyzed and processed using a control command of the user.

The input unit 120, which inputs image information (or a signal), audio information (or a signal), data, or information input from a user, may include one camera or a plurality of cameras 121 to input image information, in the AI device 10.

The camera 121 may process an image frame, such as a still image or a moving picture image, which is obtained by an image sensor in a video call mode or a photographing mode. The processed image frame may be displayed on the display unit 151 or stored in the memory 170.

The micro-phone 122 processes an external sound signal as electrical voice data. The processed voice data may be variously utilized based on a function (or an application program which is executed) being performed by the AI device 10. Meanwhile, various noise cancellation algorithms may be applied to the microphone 122 to remove noise caused in a process of receiving an external sound signal.

The user input unit 123 receives information from the user. When information is input through the user input unit 123, the processor 180 may control the operation of the AI device 10 to correspond to the input information.

The user input unit 123 may include a mechanical input unit (or a mechanical key, for example, a button positioned at a front/rear surface or a side surface of the terminal 100, a dome switch, a jog wheel, or a jog switch), and a touch-type input unit. For example, the touch-type input unit may include a virtual key, a soft key, or a visual key displayed on the touch screen through software processing, or a touch key disposed in a part other than the touch screen.

The learning processor 130 may train a model formed based on an artificial neural network by using learning data. The trained artificial neural network may be referred to as a learning model. The learning model may be used to infer a result value for new input data, rather than learning data, and the inferred values may be used as a basis for the determination to perform any action.

The learning processor 130 may include a memory integrated with or implemented in the AI device 10. Alternatively, the learning processor 130 may be implemented using an external memory directly connected to the memory 170 and the AI device or a memory retained in an external device.

The sensing unit 140 may acquire at least one of internal information of the AI device 10, surrounding environment information of the AI device 10, or user information of the AI device 10, by using various sensors.

In this case, sensors included in the sensing unit 140 include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a Lidar or a radar.

The output unit 150 may generate an output related to vision, hearing, or touch.

The output unit 150 may include at least one of a display unit 151, a sound output unit 152, a haptic module 153, or an optical output unit 154.

The display unit 151 displays (outputs) information processed by the AI device 10. For example, the display unit 151 may display execution screen information of an application program driven by the AI device 10, or a User interface (UI) and graphical User Interface (GUI) information based on the execution screen information.

As the display unit 151 forms a mutual layer structure together with a touch sensor or is integrally formed with the touch sensor, the touch screen may be implemented. The touch screen may function as the user input unit 123 providing an input interface between the AI device 10 and the user, and may provide an output interface between a terminal 100 and the user.

The sound output unit 152 may output audio data received from the communication unit 110 or stored in the memory 170 in a call signal reception mode, a call mode, a recording mode, a voice recognition mode, and a broadcast receiving mode.

The sound output unit 152 may include at least one of a receiver, a speaker, or a buzzer.

The haptic module 153 generates various tactile effects which the user may feel. A representative tactile effect generated by the haptic module 153 may be vibration.

The light outputting unit 154 outputs a signal for notifying that an event occurs, by using light from a light source of the AI device 10. Events occurring in the AI device 10 may include message reception, call signal reception, a missed call, an alarm, schedule notification, email reception, and reception of information through an application.

The memory 170 may store data for supporting various functions of the AI device 10. For example, the memory 170 may store input data, learning data, a learning model, and a learning history acquired by the input unit 120.

The processor 180 may determine at least one executable operation of the AI device 10, based on information determined or generated using a data analysis algorithm or a machine learning algorithm. In addition, the processor 180 may perform an operation determined by controlling components of the AI device 10.

The processor 180 may request, retrieve, receive, or utilize data of the learning processor 130 or data stored in the memory 170, and may control components of the AI device 10 to execute a predicted operation or an operation, which is determined as preferred, of the at least one executable operation.

When the connection of the external device is required to perform the determined operation, the processor 180 may generate a control signal for controlling the relevant external device and transmit the generated control signal to the relevant external device.

The processor 180 may acquire intention information from the user input and determine a request of the user, based on the acquired intention information.

The processor 180 may acquire intention information corresponding to the user input by using at least one of a Speech To Text (STT) engine to convert a voice input into a character string or a Natural Language Processing (NLP) engine to acquire intention information of a natural language.

At least one of the STT engine or the NLP engine may at least partially include an artificial neural network trained based on a machine learning algorithm. In addition, at least one of the STT engine and the NLP engine may be trained by the learning processor 130, by the learning processor 240 of the AI server 200, or by distributed processing into the learning processor 130 and the learning processor 240.

The processor 180 may collect history information including the details of an operation of the AI device 10 or a user feedback on the operation, store the collected history information in the memory 170 or the learning processor 130, or transmit the collected history information to an external device such as the AI server 200. The collected history information may be used to update the learning model.

The processor 180 may control at least some of the components of the AI device 10 to run an application program stored in the memory 170. Furthermore, the processor 180 may combine at least two of the components, which are included in the AI device 10, and operate the combined components, to run the application program.

Figure 3A:
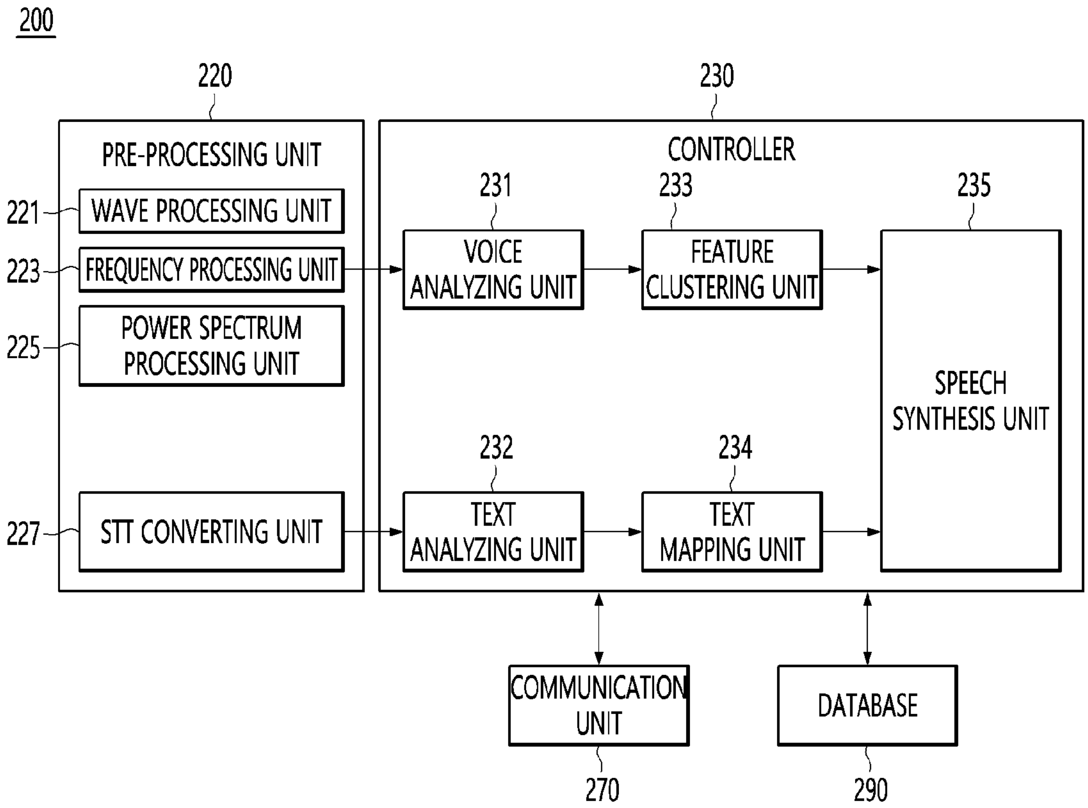
FIG. 3A is a block diagram illustrating the configuration of a voice service server according to an embodiment of the present disclosure.

FIG. 3A is a block diagram illustrating the configuration of a voice service server according to an embodiment of the present disclosure.

The speech service server 200 may include at least one of the STT server 20, the NLP server 30, or the speech synthesis server 40 illustrated in FIG. 1. The speech service server 200 may be referred to as a server system.

Referring to FIG. 3A, the speech service server 200 may include a pre-processing unit 220, a controller 230, a communication unit 270, and a database 290.

The pre-processing unit 220 may pre-process the voice received through the communication unit 270 or the voice stored in the database 290.

The pre-processing unit 220 may be implemented as a chip separate from the controller 230, or as a chip included in the controller 230.

The pre-processing unit 220 may receive a voice signal (which the user utters) and filter out a noise signal from the voice signal, before converting the received voice signal into text data.

When the pre-processing unit 220 is provided in the AI device 10, the pre-processing unit 220 may recognize a wake-up word for activating voice recognition of the AI device 10. The pre-processing unit 220 may convert the wake-up word received through the micro-phone 121 into text data. When the converted text data is text data corresponding to the wake-up word previously stored, the pre-processing unit 220 may make a determination that the wake-up word is recognized.

The pre-processing unit 220 may convert the noise-removed voice signal into a power spectrum.

The power spectrum may be a parameter indicating the type of a frequency component and the size of a frequency included in a waveform of a voice signal temporarily fluctuating The power spectrum shows the distribution of amplitude square values as a function of the frequency in the waveform of the voice signal. The details thereof be described with reference to FIG. 3B later.

Figure 3B:
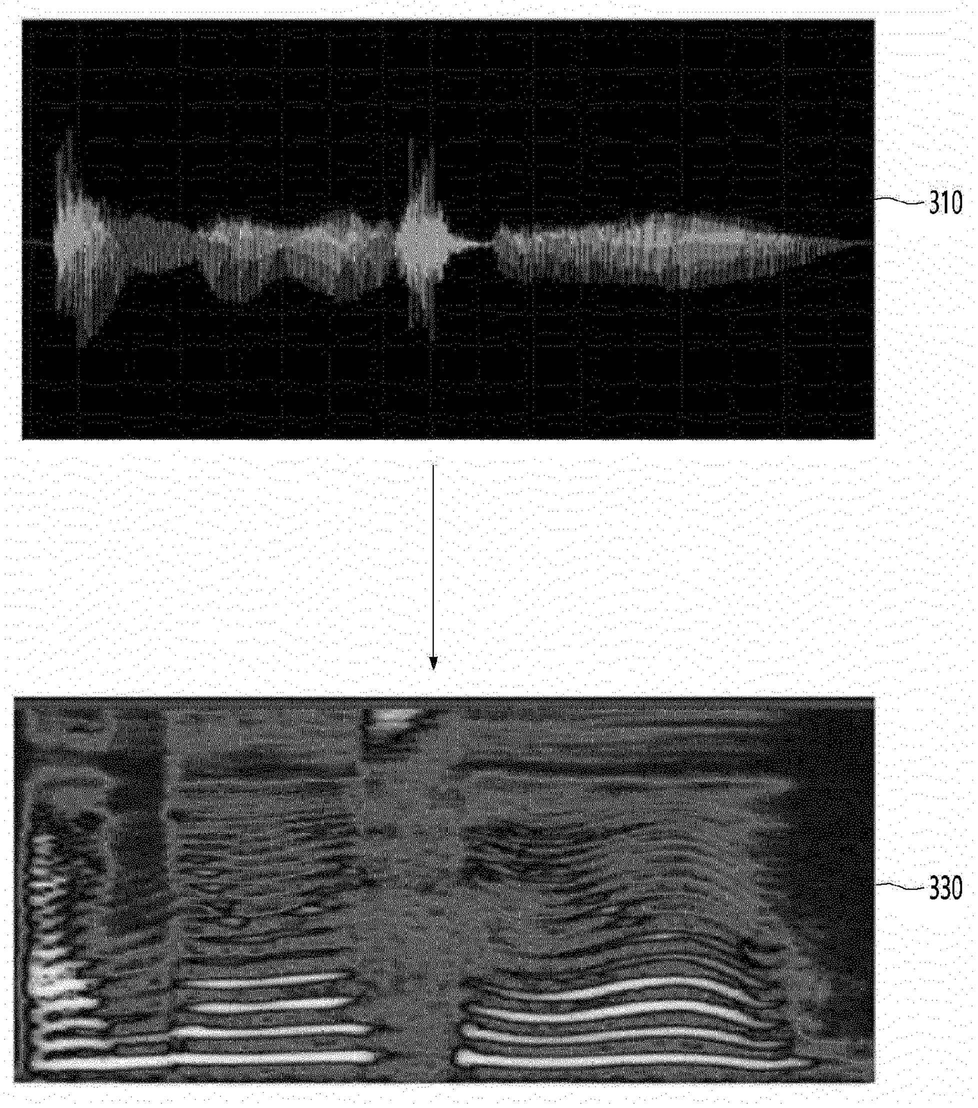
FIG. 3B is a view illustrating that a voice signal is converted into a power spectrum according to an embodiment of the present disclosure.

FIG. 3B is a view illustrating that a voice signal is converted into a power spectrum according to an embodiment of the present disclosure.

Referring to FIG. 3B, a voice signal 310 is illustrated. The voice signal 210 may be a signal received from an external device or previously stored in the memory 170.

An x-axis of the voice signal 310 may indicate time, and the y-axis may indicate the magnitude of the amplitude.

The power spectrum processing unit 225 may convert the voice signal 310 having an x-axis as a time axis into a power spectrum 330 having an x-axis as a frequency axis.

The power spectrum processing unit 225 may convert the voice signal 310 into the power spectrum 330 by using fast Fourier Transform (FFT).

The x-axis and the y-axis of the power spectrum 330 represent a frequency, and a square value of the amplitude.

FIG. 3A will be described again.

The functions of the pre-processing unit 220 and the controller 230 described in FIG. 3A may be performed in the NLP server 30.

The pre-processing unit 220 may include a wave processing unit 221, a frequency processing unit 223, a power spectrum processing unit 225, and a STT converting unit 227.

The wave processing unit 221 may extract a waveform from a voice.

The frequency processing unit 223 may extract a frequency band from the voice.

The power spectrum processing unit 225 may extract a power spectrum from the voice.

The power spectrum may be a parameter indicating a frequency component and the size of the frequency component included in a waveform temporarily fluctuating, when the waveform temporarily fluctuating is provided.

The STT converting unit 227 may convert a voice into a text.

The STT converting unit 227 may convert a voice made in a specific language into a text made in a relevant language.

The controller 230 may control the overall operation of the speech service server 200.

The controller 230 may include a voice analyzing unit 231, a text analyzing unit 232, a feature clustering unit 233, a text mapping unit 234, and a speech synthesis unit 235.

The voice analyzing unit 231 may extract characteristic information of a voice by using at least one of a voice waveform, a voice frequency band, or a voice power spectrum which is pre-processed by the pre-processing unit 220.

The characteristic information of the voice may include at least one of information on the gender of a speaker, a voice (or tone) of the speaker, a sound pitch, the intonation of the speaker, a speech rate of the speaker, or the emotion of the speaker.

In addition, the characteristic information of the voice may further include the tone of the speaker.

The text analyzing unit 232 may extract a main expression phrase from the text converted by the STT converting unit 227.

When detecting that the tone is changed between phrases, from the converted text, the text analyzing unit 232 may extract the phrase having the different tone as the main expression phrase.

When a frequency band is changed to a preset band or more between the phrases, the text analyzing unit 232 may determine that the tone is changed.

The text analyzing unit 232 may extract a main word from the phrase of the converted text. The main word may be a noun which exists in a phrase, but the noun is provided only for the illustrative purpose.

The feature clustering unit 233 may classify a speech type of the speaker using the characteristic information of the voice extracted by the voice analyzing unit 231.

The feature clustering unit 233 may classify the speech type of the speaker, by placing a weight to each of type items constituting the characteristic information of the voice.

The feature clustering unit 233 may classify the speech type of the speaker, using an attention technique of the deep learning model.

The text mapping unit 234 may translate the text converted in the first language into the text in the second language.

The text mapping unit 234 may map the text translated in the second language to the text in the first language.

The text mapping unit 234 may map the main expression phrase constituting the text in the first language to the phrase of the second language corresponding to the main expression phrase.

The text mapping unit 234 may map the speech type corresponding to the main expression phrase constituting the text in the first language to the phrase in the second language. This is to apply the speech type, which is classified, to the phrase in the second language.

The speech synthesis unit 235 may generate the synthetic voice by applying the speech type, which is classified in the feature clustering unit 233, and the tone of the speaker to the main expression phrase of the text translated in the second language by the text mapping unit 234.

The controller 230 may determine an speech feature of the user by using at least one of the transmitted text data or the power spectrum 330.

The speech feature of the user may include the gender of a user, the pitch of a sound of the user, the sound tone of the user, the topic uttered by the user, the speech rate of the user, and the voice volume of the user.

The controller 230 may obtain a frequency of the voice signal 310 and an amplitude corresponding to the frequency using the power spectrum 330.

The controller 230 may determine the gender of the user who utters the voice, by using the frequency band of the power spectrum 230.

For example, when the frequency band of the power spectrum 330 is within a preset first frequency band range, the controller 230 may determine the gender of the user as a male.

When the frequency band of the power spectrum 330 is within a preset second frequency band range, the controller 230 may determine the gender of the user as a female. In this case, the second frequency band range may be greater than the first frequency band range.

The controller 230 may determine the pitch of the voice, by using the frequency band of the power spectrum 330.

For example, the controller 230 may determine the pitch of a sound, based on the magnitude of the amplitude, within a specific frequency band range.

The controller 230 may determine the tone of the user by using the frequency band of the power spectrum 330. For example, the controller 230 may determine, as a main sound band of a user, a frequency band having at least a specific magnitude in an amplitude, and may determine the determined main sound band as a tone of the user.

The controller 230 may determine the speech rate of the user based on the number of syllables uttered per unit time, which are included in the converted text data.

The controller 230 may determine the uttered topic by the user through a Bag-Of-Word Model technique, with respect to the converted text data.

The Bag-Of-Word Model technique is to extract mainly used words based on the frequency of words in sentences. Specifically, the Bag-Of-Word Model technique is to extract unique words within a sentence and to express the frequency of each extracted word as a vector to determine the feature of the uttered topic.

For example, when words such as “running” and “physical strength” frequently appear in the text data, the controller 230 may classify, as exercise, the uttered topic by the user.

The controller 230 may determine the uttered topic by the user from text data using a text categorization technique which is well known. The controller 230 may extract a keyword from the text data to determine the uttered topic by the user.

The controller 230 may determine the voice volume of the user voice, based on amplitude information in the entire frequency band.

For example, the controller 230 may determine the voice volume of the user, based on an amplitude average or a weight average in each frequency band of the power spectrum.

The communication unit 270 may make wired or wireless communication with an external server.

The database 290 may store a voice in a first language, which is included in the content.

The database 290 may store a synthetic voice formed by converting the voice in the first language into the voice in the second language.

The database 290 may store a first text corresponding to the voice in the first language and a second text obtained as the first text is translated into a text in the second language.

The database 290 may store various learning models necessary for speech recognition.

Meanwhile, the processor 180 of the AI device 10 illustrated in FIG. 2 may include the pre-processing unit 220 and the controller 230 illustrated in FIG. 3.

In other words, the processor 180 of the AI device 10 may perform a function of the pre-processing unit 220 and a function of the controller 230.

Figure 4:
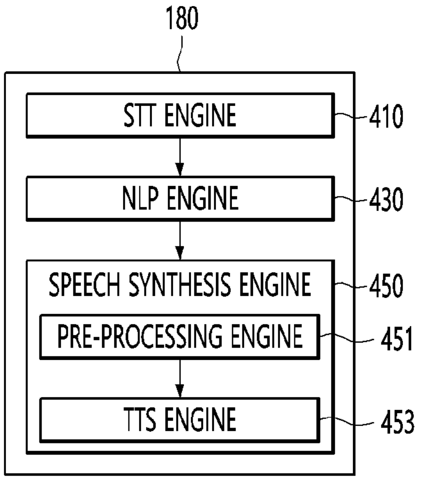
FIG. 4 is a block diagram illustrating a configuration of a processor for recognizing and synthesizing a voice in an AI device according to an embodiment of the present disclosure.

FIG. 4 is a block diagram illustrating a configuration of a processor for recognizing and synthesizing a voice in an AI device according to an embodiment of the present disclosure.

In other words, the processor for recognizing and synthesizing a voice in FIG. 4 may be performed by the learning processor 130 or the processor 180 of the AI device 10, without performed by a server.

Referring to FIG. 4, the processor 180 of the AI device 10 may include an STT engine 410, an NLP engine 430, and a speech synthesis engine 450.

Each engine may be either hardware or software.

The STT engine 410 may perform a function of the STT server 20 of FIG. 1. In other words, the STT engine 410 may convert the voice data into text data.

The NLP engine 430 may perform a function of the NLP server 30 of FIG. 2A. In other words, the NLP engine 430 may acquire intention analysis information, which indicates the intention of the speaker, from the converted text data.

The speech synthesis engine 450 may perform the function of the speech synthesis server 40 of FIG. 1.

The speech synthesis engine 450 may retrieve, from the database, syllables or words corresponding to the provided text data, and synthesize the combination of the retrieved syllables or words to generate a synthetic voice.

The speech synthesis engine 450 may include a pre-processing engine 451 and a text-to-speech (TTS) engine 453.

The pre-processing engine 451 may pre-process text data before generating the synthetic voice.

Specifically, the pre-processing engine 451 performs tokenization by dividing text data into tokens which are meaningful units.

After the tokenization is performed, the pre-processing engine 451 may perform a cleansing operation of removing unnecessary characters and symbols such that noise is removed.

Thereafter, the pre-processing engine 451 may generate the same word token by integrating word tokens having different expression manners.

Thereafter, the pre-processing engine 451 may remove a meaningless word token (informal word; stopword).

The TTS engine 453 may synthesize a voice corresponding to the preprocessed text data and generate the synthetic voice.

Figure 5:
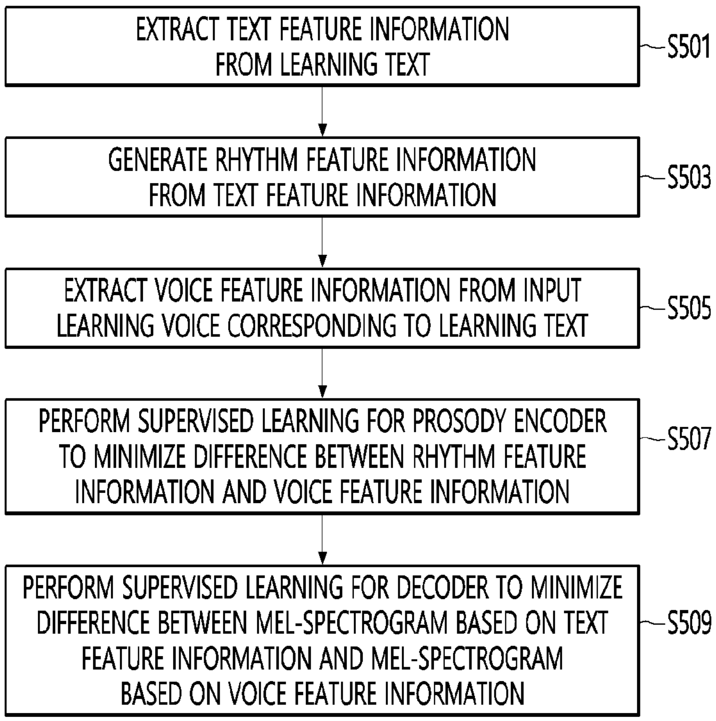
FIG. 5 is a flowchart illustrating a learning method of a speech synthesis device according to an embodiment of the present disclosure.
Figure 6:
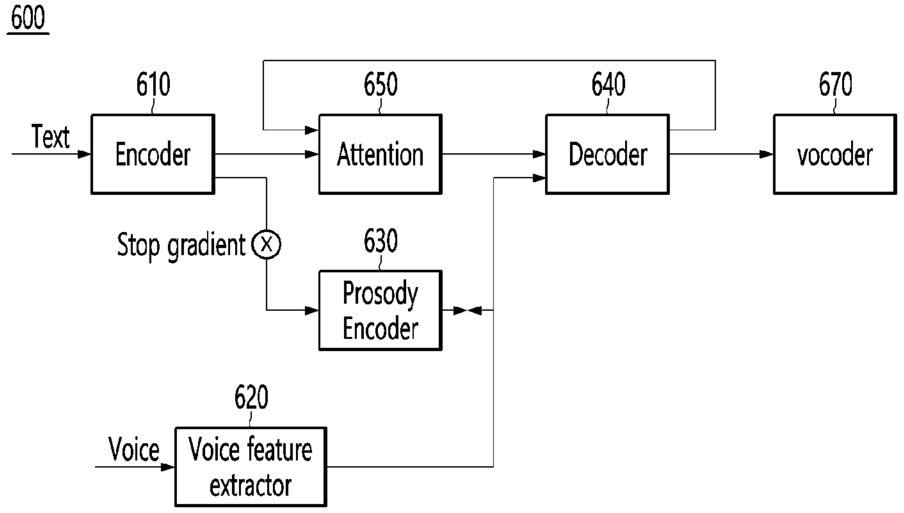
FIG. 6 is a view illustrating a configuration of a speech synthesis model according to an embodiment of the present disclosure.

FIG. 5 is a flowchart illustrating a learning method of a speech synthesis device according to an embodiment of the present disclosure, and FIG. 6 is a view illustrating a configuration of a speech synthesis model according to an embodiment of the present disclosure.

A speech synthesis device 600 of FIG. 6 may include all components of the AI device 10 of FIG. 2.

Each component of the speech synthesis device 600 may be included in the processor 180 or may be controlled by the processor 180.

Referring to FIG. 5, an encoder 610 extracts text feature information from a learning text (S501).

The encoder 610 may normalize the learning text, may divide sentences of the normalized text, and convert phonemes in the normalized text, to generate text feature information representing the features of the text.

The text feature information may be expressed as a feature vector.

A prosody encoder 630 generates rhythm feature information from the text feature information (S503).

The prosody encoder 630 may predict rhythm feature information from text feature information transmitted from the encoder 610. The rhythm feature information may include the same type of information as that of feature information of a learning voice.

A voice feature extractor 620 extracts voice feature information from the input learning voice (S505).

A voice feature extractor 620 may acquire a spectrum by performing Fourier transform on each of all unit frames of the learning voice. The spectrum may include feature information of the learning voice.

The voice feature information of the learning voice may include at least one of an average time, a pitch, a pitch range, energy, or a spectral slope for each phoneme.

The processor 180 performs supervised learning for the prosody encoder 630 to minimize a difference between the rhythm feature information and voice feature information (S507).

The processor 180 may perform supervised learning for the prosody encoder 630 to minimize the loss function indicating the difference between the rhythm feature information and the voice feature information The processor 180 may perform supervised learning for the prosody encoder 630 by using an artificial neural network employing a deep learning algorithm or a machine learning algorithm. The voice feature information may be labeled on the rhythm feature information while serving as correct answer data.

The processor 180 performs supervised learning for the decoder 640 to minimize the difference between a Mel-spectrogram based on text feature information and a Mel-spectrogram based on voice feature information (S509).

The processor 180 may perform supervised learning for the decoder 640 to minimize the loss function for indicating the difference between a Mel-spectrogram based on text feature information and a Mel-spectrogram based on voice feature information.

The processor 180 may perform supervised learning for the decoder 640 by using an artificial neural network employing a deep learning algorithm or a machine learning algorithm. The Mel-spectrogram based on the voice feature information may be labeled on a Mel-spectrogram based on the text feature information while serving as correct answer data.

Referring to FIG. 6, the speech synthesis device 600 may include an encoder 610, a voice feature extractor 620, a prosody encoder 630, a decoder 640, an attention 650, and a vocoder 670.

The encoder 610 may receive a learning text. The encoder 610 may normalize the learning text, divide sentences of the normalized text, and convert phonemes of the divided sentences to generate text feature information representing the feature of the text.

The text feature information may be represented in the form of a vector.

The voice feature extractor 620 may extract a feature from the input learning voice. The learning voice may be a voice for the learning text.

The voice feature extractor 620 may generate a unit frame by dividing the learning voice in the unit of specific time duration (for example, 25 ms). The voice feature extractor 620 may perform Fourier Transform on each of the unit frames to extract frequency information contained in the relevant unit frame.

The voice feature extractor 620 may acquire a spectrum by performing Fourier transform on each of all unit frames of the learning voice. The spectrum may include the feature information of the learning voice.

The feature information on the learning voice may include at least one of an average time, a voice pitch, a pitch range, energy, or a spectral slope for each phoneme.

The average time for each phoneme may be a value obtained by dividing the time of the voice used for learning by the number of phonemes.

The voice feature extractor 620 may divide the voice for each frame to extract the pitch of each frame and may calculate an average of the extracted pitch. The average of the pitches may be the voice pitch.

The pitch range may be calculated as a difference between a 95% quantile value and a 5% quantile value with respect to the pitch information extracted for each frame.

The energy may be the decibel of the voice.

The spectral slope may be the coefficient of the first order term obtained through the sixteenth linear predictive analysis for the voice.

The voice feature extractor 620 may normalize the average time, the voice pitch, the pitch range, the energy, and the spectral slope, for each phoneme, and may transform the normalized feature information into values between −1 and 1.

The prosody encoder 630 may predict rhythm feature information from text feature information received from the encoder 610. The rhythm feature information may include the same type of information as feature information on a learning voice.

The prosody encoder 630 may extract a feature vector from text feature information on the learning text and output rhythm feature information based on the extracted feature vector.

The prosody encoder 630 may be trained to minimize the difference between the rhythm feature information and the feature information on a voice for learning. In other words, the learning may be performed to minimize the difference between the predicted rhythm feature information and the feature information on the learning voice, as the feature information on the learning voice is labeled on the correct answer data.

The prosody encoder 630 may be set not to differentiate a vector representing the text feature information received from the encoder 610.

The decoder 640 may output a word vector, which corresponds to a word, from the text feature information.

The attention 650 may refer to a sequence of a whole text input from the encoder 610 whenever the word vector is output from the decoder 640. The attention 650 may determine whether there is a correlation with a word to be predicted at a corresponding time point by referring to the sequence of the whole text.

The attention 650 may output a context vector to the decoder 640 depending on the determination result. The context vector may be referred to as a text feature vector.

The decoder 640 may generate a text-based Mel spectrogram based on the context vector.

The decoder 640 may generate a voice-based Mel spectrogram based on a spectrum of a learning voice output from the voice feature extractor 620.

The Mel spectrogram may be a spectrum obtained by converting a frequency unit of a spectrum, based on a Mel scale.

The decoder 640 may generate a Mel spectrogram through a Mel filter that finely analyzes a specific frequency range and less finely analyzes the remaining frequency range except for the specific frequency range.

The decoder 640 may be supervised and trained to minimize the difference between a text-based Mel spectrogram and a voice-based Mel spectrogram. When the decoder 640 is supervised and trained, the voice-based Mel spectrogram may be labeled as the correct answer data.

The vocoder 670 may generate a synthetic voice based on the Mel spectrogram output from the decoder 640.

Figure 7:
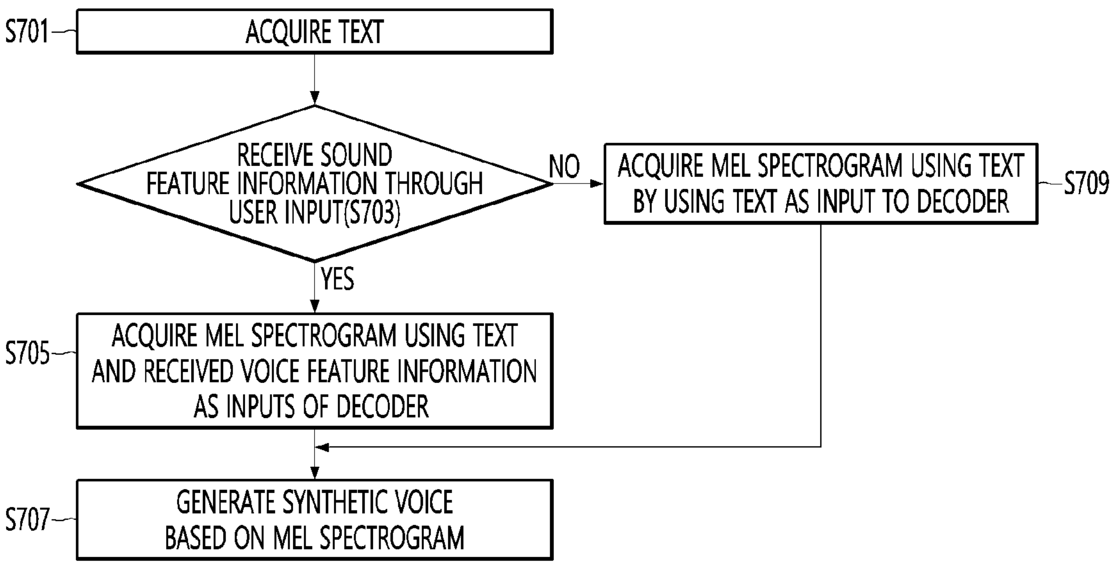
FIG. 7 is a flowchart illustrating a method of generating a synthetic voice of a speech synthesis device according to an embodiment of the present disclosure.
Figure 8:
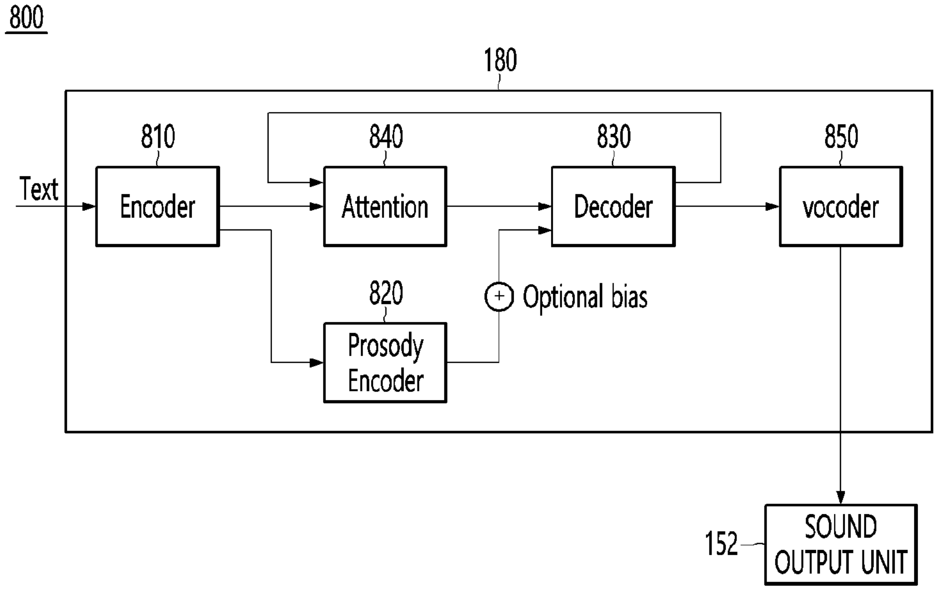
FIG. 8 is a view illustrating an inference process of a speech synthesis model according to an embodiment of the present disclosure.

FIG. 7 is a flowchart illustrating a method of generating a synthetic voice of a speech synthesis device according to an embodiment of the present disclosure, and FIG. 8 is a view illustrating an inference process of a speech synthesis model according to an embodiment of the present disclosure.

Referring to FIG. 8, the speech synthesis device 800 may include a processor 180 and a sound output unit 152.

In addition, the speech synthesis device 800 may include components of the AI device 10 illustrated in FIG. 2.

Referring to FIG. 7, the processor 180 acquires a text which is a target for generating a synthetic voice (S701).

Text data corresponding to the text may be input to the encoder 810.

The processor 180 determines whether voice feature information is received through a user input (S703).

According to an embodiment, the voice feature information may include at least one of at least one of an average time, a pitch, a pitch range, energy, or a spectral slope for each phoneme.

Among the five items included in the voice feature information, an item not obtained through the user input may be set to a default value.

According to an embodiment, the processor 180 may receive voice feature information through a menu screen displayed on the display unit 151.

When receiving the voice feature information through the user input, the processor 180 acquires a Mel spectrogram using the text and the received voice feature information as inputs of the decoder 830 (S705).

The decoder 830 may generate the Mel spectrogram, based on the feature information of the text and the voice feature information received through the user input.

The feature information of the text may be normalized into information representing the feature of the text and expressed in the form of a text feature vector.

The voice feature information may include values obtained by normalizing at least one of an average time, a pitch, a pitch range, energy, or a spectral slope for each phoneme. The voice feature information may be represented in the form of a voice feature vector.

The decoder 830 may generate a Mel spectrogram using a text feature vector and a voice feature vector.

The decoder 830 may be a speech synthesis model for inferring the Mel spectrogram from the text feature vector and the voice feature vector.

The decoder 830 may generate a basic Mel spectrogram based on the text feature information, and may generate the final Mel spectrogram by reflecting the voice feature information in the basic Mel spectrogram.

The processor 180 generates the synthetic voice based on the Mel spectrogram (S707).

When the voice feature information is not received through a user input, the processor 180 acquires the Mel spectrogram using a text as an input of the decoder 830 (S709), and generates the synthetic voice based on the acquired Mel spectrogram.

The processor 180 may generate text feature information from the text, generate the Mel spectrogram based on the text feature information, and generate a synthetic voice based on the generated Mel spectrogram.

According to another embodiment, when the voice feature information is not received, the processor 180 may generate the Mel spectrogram by receiving, as inputs, the rhythm feature information output from the prosody encoder 820 and text feature information corresponding to the text.

Referring to FIG. 8, the processor 180 may include an encoder 810, a prosody encoder 820, a decoder 830, an attention 840 and a vocoder 850.

The encoder 810 may receive text.

The encoder 680 may normalize the text, divide the sentence of the normalized text, and perform phoneme conversion for the sentence to generate text feature information representing the features of the text. The text feature information may be represented in the form of a vector.

The prosody encoder 820 may predict rhythm feature information from the text feature information transmitted from the encoder 610. The rhythm feature information may include the same type of information as that of the voice feature information.

The prosody encoder 820 may be an encoder in which supervised learning of the prosody encoder 830 of FIG. 6 is completed.

When the voice feature information is received through a user input, the prosody encoder 820 may use the received voice feature information as an output of the prosody encoder 820. In other words, when the prosody encoder 820 receives the voice feature information through a user input, the prosody encoder 820 may transmit the received voice feature information to the decoder 830 without predicting the rhythm feature information.

When the prosody encoder 820 does not receive the voice feature information through the user input, the rhythm feature information may be generated based on the text feature information. The generated rhythm feature information may be transmitted to the decoder 830.

The decoder 830 may output a word vector corresponding to a word from the text feature information.

The attention 840 may refer to a sequence of the whole text input from the encoder 610, whenever a word vector is output from the decoder 640. The attention 840 may determine whether a correlation with a word to be predicted is present at a relevant time point, based on the sequence of the whole text.

The attention 840 may output the context vector to the decoder 830 depending on the determination result. The context vector may be referred to as a text feature vector.

The decoder 830 may generate a text-based basic Mel spectrogram based on the context vector. The decoder 830 may generate the final Mel spectrogram by reflecting voice feature information on the basic Mel spectrogram.

The vocoder 850 may convert the final Mel spectrogram into a synthetic voice signal and output the converted synthetic voice signal to the sound output unit 152.

Figure 9:
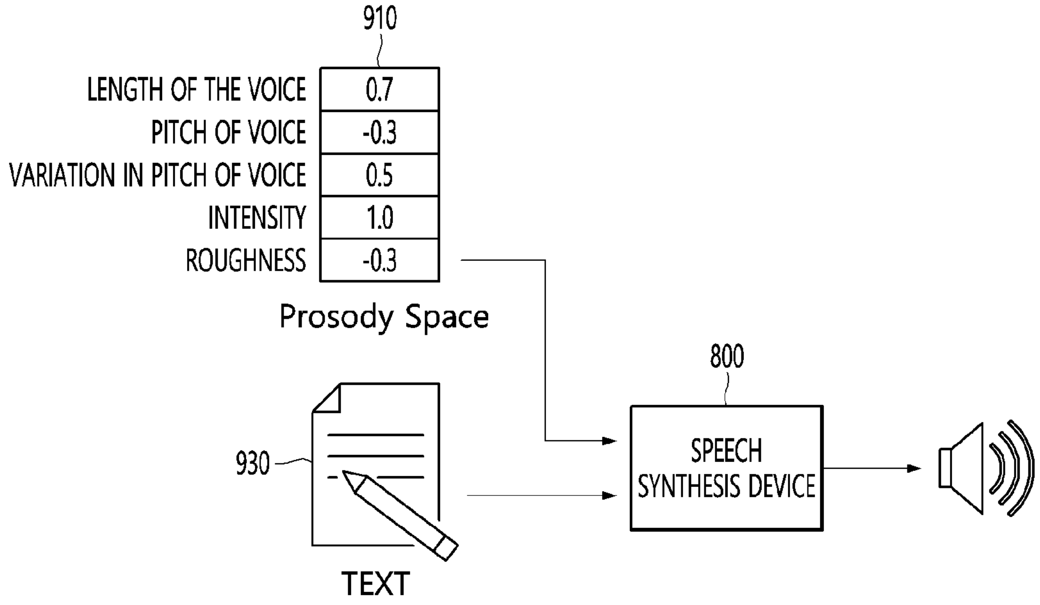
FIG. 9 is a view illustrating a process of generating a controllable synthetic voice according to an embodiment of the present disclosure.

FIG. 9 is a view illustrating a process of generating a controllable synthetic voice according to an embodiment of the present disclosure.

Referring to FIG. 9, the speech synthesis device 800 may receive a text 910 and voice feature information 930.

The voice feature information 930 may include values for the length of the voice, the pitch of the voice, the variation in the pitch of the voice, the intensity of the voice, and the roughness of the voice, respectively. The value of each item may range from −1 to 1.

The user may input a value of each item depending on a desired speech style.

The length of the voice may indicate an average time for each phoneme.

The height of the voice may indicate the pitch of the voice.

The variation in the pitch of the voice may indicate a pitch range of the voice.

The intensity of the voice may represent the energy (or decibel) of the voice.

The roughness of the voice may indicate the spectral slope of the voice.

The speech synthesis device 800 may convert a text into a voice signal and generate a synthetic voice by reflecting voice feature information 830 in the voice signal.

In other words, the speech synthesis device 800 may output a synthetic voice employing a rhyme desired by a user.

As described above, the speech synthesis device 800 according to an embodiment of the present disclosure may generate a synthetic voice of a style desired by the user to satisfy the user needs.

Figure 10:
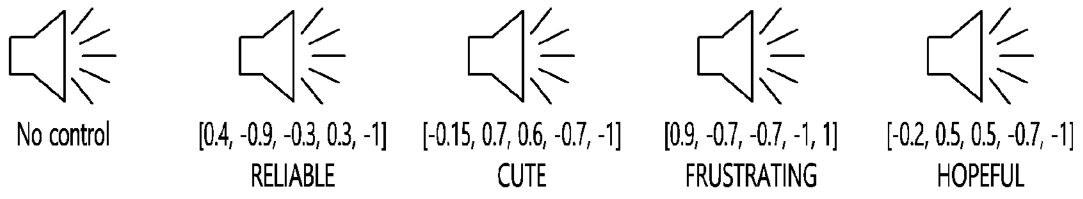
FIG. 10 is a view illustrating that a voice is synthesized in various styles even for the same speaker.

FIG. 10 is a view illustrating that a voice is synthesized in various styles even for the same speaker.

When the user does not input the voice feature information, the speech synthesis device 800 may output a synthetic voice based on text.

When receiving the voice feature information 830 of [0.4, −0.9, −0.3, 0.3, −1], the voice synthesizing device 800 may output a synthetic voice which is reliable.

When receiving voice feature information 830 of [−0.15, 0.7, 0.6, −0.7, −1], the speech synthesis device 800 may output a synthetic voice which is cute.

When receiving the voice feature information 830 of [0.9, −0.7, −0.7, −1, 1], the voice synthesizing device 800 may output a synthetic voice which is frustrating.

When receiving the voice feature information 830 of [−0.2, 0.5, 0.5, −0.7, −1], the speech synthesis device 800 may output a synthetic voice which is hopeful.

As described above, according to an embodiment of the present disclosure, even when the same learning data (voice data uttered by the same speaker) is used, a synthetic voice may be output in various speech styles.

Accordingly, the user may acquire the synthetic voice by adjusting the speech style depending on the situation.

The above-described invention is able to be implemented with computer-readable codes on a medium having a program. Computer-readable medium includes all types of recording devices having data which is readable by a computer system. For example, the computer-readable medium includes a hard disk drive (HDD), a solid state disk (SSD), a silicon disk drive (SDD), a ROM, a RAM, a CD-ROM, a magnetic tape, a floppy disk, or an optical data storage device. In addition, the computer may include the processor 180 of an AI device.

What is claimed is:

1. A speech synthesis device comprising:
- a speaker; and
- a processor configured to:
- acquire voice feature information based on an input of text and a user input to the speech synthesis device;
- generate a synthetic voice, by receiving the text and the voice feature information as inputs into a decoder supervised-trained to minimize a difference between feature information of a learning text and characteristic information of a learning voice; and
- output the generated synthetic voice through the speaker,
- wherein the processor includes:
- a prosody encoder configured to predict a prosody based on the text, and
- wherein the processor is configured to generate the synthetic voice by receiving, as inputs, rhythm feature information, which is output from the prosody encoder, and text feature information corresponding to the text, when the voice feature information is not received.

2. The speech synthesis device of claim 1, wherein the voice feature information includes:
- at least one of an average time, a pitch, a pitch range, energy, or a spectral slope for each phoneme.

3. The speech synthesis device of claim 2, wherein the average time, the pitch, the pitch range, the energy, or the spectral slope for the phoneme are received as normalized values.

4. The speech synthesis device of claim 2, wherein the prosody decoder infers a Mel spectrum by using text feature information based on the text and the voice feature information.

5. The speech synthesis device of claim 1, wherein the processor includes:
- an encoder configured to generate text feature information based on the text.

6. The speech synthesis device of claim 5, wherein the processor is further configured to determine whether a word output from the prosody decoder has a correlation with a word to be predicted at a relevant time point, based on a sequence of the text, and to output a context vector, depending on a determination result.

7. A method for operating a speech synthesis device, the method comprising:
- acquiring voice feature information through an input of text and a user input to the speech synthesis device;
- generating a synthetic voice, by receiving the text and the voice feature information as inputs into a decoder supervised-trained to minimize a difference between feature information of a learning text and characteristic information of a learning voice; and outputting the generated synthetic voice through a speaker, wherein the speech synthesis device includes:

a prosody encoder to predict a prosody based on the text, and wherein the method further includes:

generating the synthetic voice by receiving, as inputs, prosody feature information, which is output from the prosody encoder, and text feature information corresponding to the text, when the voice feature information is not received.

8. The method of claim 7, wherein the voice feature information includes:

at least one of an average time, a pitch, a pitch range, energy, or a spectral slope for each phoneme.

9. The method of claim 8, wherein the average time, the pitch, the pitch range, the energy, or the spectral slope for the phoneme are received as normalized values.

10. The method of claim 8, further comprising:

inferring via the prosody decoder a Mel spectrum by using text feature information based on the text and the voice feature information.

11. The method of claim 7, further comprising:

generating text feature information based on the text.

12. The method of claim 11, further comprising determining whether a word output from the prosody decoder has a correlation with a word to be predicted at a relevant time point, based on a sequence of the text; and outputting a context vector, depending on a determination result.

* * * * *